(12) United States Patent
Petry

(10) Patent No.: US 11,614,757 B2
(45) Date of Patent: Mar. 28, 2023

(54) ESTIMATING A MAXIMUM FLOW THROUGH A HEAT EXCHANGER

(71) Applicant: Siemens Schweiz AG, Zürich (CH)

(72) Inventor: Karl-Heinz Petry, Reichenburg (CH)

(73) Assignee: SIEMENS SCHWEIZ AG, Zurich (CH)

( * ) Notice: Subject to any disclaimer, the term of this patent is extended or adjusted under 35 U.S.C. 154(b) by 27 days.

(21) Appl. No.: 17/373,887

(22) Filed: Jul. 13, 2021

(65) Prior Publication Data

US 2022/0019249 A1     Jan. 20, 2022

(30) Foreign Application Priority Data

Jul. 15, 2020   (EP) ...................................... 20185888
Dec. 22, 2020   (EP) ...................................... 20216714

(51) Int. Cl.
| | | |
|---|---|---|
| G05D 7/06 | (2006.01) | |
| F24F 11/63 | (2018.01) | |
| F24F 11/84 | (2018.01) | |
| F24F 11/88 | (2018.01) | |
| H04W 4/80 | (2018.01) | |
| F16K 37/00 | (2006.01) | |

(52) U.S. Cl.
CPC ............ *G05D 7/0635* (2013.01); *F24F 11/63* (2018.01); *F24F 11/84* (2018.01); *F24F 11/88* (2018.01); *H04W 4/80* (2018.02); *F16K 37/0041* (2013.01)

(58) Field of Classification Search
CPC .......... G05D 7/0635; F24F 11/63; F24F 11/84
USPC ......................................................... 700/276
See application file for complete search history.

(56) References Cited

U.S. PATENT DOCUMENTS

| | | | |
|---|---|---|---|
| 2011/0048551 A1* | 3/2011 | Tanaka ................. | G05D 7/0635 137/486 |
| 2011/0114304 A1 | 5/2011 | Keller ..................... | F28F 27/00 |
| 2019/0018432 A1 | 1/2019 | Petry ........................ | G05D 7/06 |

FOREIGN PATENT DOCUMENTS

| | | | |
|---|---|---|---|
| EP | 3 489 591 | 12/1991 | ............. C22B 19/12 |
| EP | 3 115 703 | 1/2017 | ............. F24D 19/10 |
| EP | 3 428 767 | 1/2019 | ............. G05D 16/00 |
| WO | 2010 010092 | 1/2010 | ............. F24D 19/10 |

* cited by examiner

*Primary Examiner* — Jigneshkumar C Patel
(74) *Attorney, Agent, or Firm* — Slayden Grubert Beard PLLC

(57) ABSTRACT

Maximum flow setting. A method of limiting flow through a valve (1) comprising: reading a time series of signals from a flow sensor (5a, 5b); producing a time series of flow rates from the time series of signals; producing an averaged series of values; producing a first bounded series of values by replacing values that are below a lower threshold (13) with the lower threshold (13); producing a second bounded series of values by replacing values that exceed an upper threshold (15) with values that equal the upper threshold (15); producing a maximum flow rate by applying a moving maximum filter (17) to the second bounded series; reading a set point signal (9); limiting the set point signal (9) to the maximum flow rate; producing an actuation signal from the limited set point signal; transmitting the actuation signal to an actuator (7).

11 Claims, 4 Drawing Sheets

ESTIMATING A MAXIMUM FLOW THROUGH A HEAT EXCHANGER

TECHNICAL FIELD

The present disclosure relates to heat exchangers. Various embodiments of the teachings herein include methods and/or devices for estimating maximum flow through a heat exchanger.

CROSS-REFERENCE TO RELATED APPLICATIONS

This application claims priority to EP Application No. 20216714.4 filed Dec. 22, 2020 and EP Application No. 20185888.3 filed on Jul. 15, 2020, the contents of which are hereby incorporated by reference in their entirety.

BACKGROUND

Installations for heating, ventilation, and/or air-conditioning (HVAC) are commonly made up of a plurality of circuits. Each circuit comprises one or several terminal units to provide heating and/or cooling to various parts of a building. Terminal units can be heating devices and/or cooling devices. A terminal unit of a domestic heating system can be a heat exchanger such as a radiator.

Factors such as pipe cross-sections, valve characteristics, positions of terminal units within the distribution network etc. affect the flow through the heat exchangers of a HVAC installation. These factors yield hydraulic resistances that vary throughout the system. Hydraulic resistances relate pressure drop to flow of a heating medium or to flow of a coolant. HVAC installations such as heating systems often require hydronic balancing. Hydronic balancing overcomes issues due to different hydraulic resistances of the circuits of a HVAC installation. Hydronic balancing of heating installations of commercial, residential and/or industrial sites ensures that each circuit of a system experiences adequate flow.

That said, hydronic balancing is generally performed on a site as designed and/or as built. Since the hydraulic resistances of a HVAC installation vary throughout operation, flow in the heat exchangers of an installation can become inadequate and/or incorrect over time.

A position of a valve of a heat exchanger is determined in accordance with EP3428767B1 from a set point value and from a default flow rate. Determination of the position of the valve involves an opening curve of the valve. The valve assembly of EP3428767B1 affords determinations of valve positions at flow rates that are substantially zero. The valve assembly of EP3428767B1 also affords determinations of valve positions after the design stage of a commercial, residential and/or industrial site. The determined valve positions do, however, depend on a default flow rate. That default flow rate can be inadequate because hydraulic resistances can change over time.

The patent application EP3115703A1 and the patent EP3115703B1 address control of heating, ventilation, air conditioning systems. To that end, limit positions are determined for each of the valves of the heat exchangers of a HVAC installation. The determination of limit positions involves temperature measurements and temperature rise quantities derived from the temperature measurements. Determinations of limit positions and of flow settings of valves in accordance with EP3115703B1 can be effected after the design stage of a building.

EP3489591A1 teaches a control system limiting flow through a heat exchanger to a determined maximum flow value. Determination of the maximum flow value through a heat exchanger is based on a characteristic transfer function of the heat exchanger. The characteristic transfer function is derived from a plurality of values of heat exchanger effectiveness (HXeff). The characteristic transfer function is also derived from a plurality of flow values. The values of heat exchanger effectiveness (HXeff) and the flow values are recorded by the control system of EP3489591A1 for various points in time. Determinations of maximum flow settings in accordance with EP3489591A1 can be carried out after the design stage of a building.

Transients within HVAC circuits can cause valve controllers of local heat exchangers to open positions of their valves. Those valve positions can in practice exceed the limits of what is necessary to comply with a demand for heating or for cooling. Excessive flow through the heat exchangers of the HVAC circuit results in waste of power. Excessive flow through the heat exchangers of the HVAC circuit can also result in additional wear of the moving parts of a valve. The instant disclosure introduces a dynamic maximum setting for valves of heat exchangers of a HVAC circuit. The dynamic maximum setting mitigates excessive flow through such heat exchangers and limits ramifications of transients within HVAC circuits.

SUMMARY

Various embodiments of the teachings of the present disclosure may include a method of limiting flow through a valve (1) comprising a valve member (6) and an actuator (7) coupled to the valve member (6), the method comprising a plurality of iterations, each iteration comprising the steps of: reading a time series of signals from a flow sensor (5a, 5b) of the valve (1); producing a time series of flow rates from the time series of signals; producing an averaged series of values by determining a plurality of moving averages of the time series of flow rates; producing a first bounded series of values by replacing values of the averaged series that are below a lower threshold (13) with values that equal the lower threshold (13); producing a second bounded series of values by replacing values of the first bounded series that exceed an upper threshold (15) with values that equal the upper threshold (15); producing a maximum flow rate by applying a maximum filter (17) to the second bounded series, the maximum filter (17) returning the largest value of the second bounded series; reading a set point signal (9) indicative of a flow rate through the valve (1); limiting the set point signal (9) to the produced maximum flow rate; producing an actuation signal from the limited set point signal (9); and transmitting the actuation signal to the actuator (7), the actuation signal causing the actuator (7) to set a position of the valve member (6) in accordance with the actuation signal.

In some embodiments, the method comprising a plurality of iterations, each iteration comprising the step of changing the time series of flow rates by multiplying each flow rate of the time series of flow rates with a scale factor.

In some embodiments, the method comprising the steps of: connecting to a mobile handheld device (18); receiving a mobile application signal from the mobile handheld device (18) using a digital communication protocol; setting at least one variable as a function of the mobile application signal, the at least one variable being selected from: a window size for a moving average filter (11), a lower threshold value, an upper threshold value, a window size of for the maximum filter (17), after setting the at least one variable, the method iteratively performing the steps of: reading the time series of signals from the flow sensor (5a, 5b); producing the time series of flow rates from the time series of signals; producing the averaged series of values by applying the moving average filter (11) to the time series of flow rates, the moving average filter (11) determining a plurality of subsets of the time series of flow rates and calculating an arithmetic average for each subset of the plurality of subsets, each subset of the plurality of subsets being at least as long as the window size of moving average filter (11); producing the first bounded series of values by replacing values of the averaged series that are below the lower threshold value with values that equal the lower threshold value; producing the second bounded series of values by replacing values of the first bounded series that exceed the upper threshold value with values that equal the upper threshold value; producing the maximum flow rate by applying the maximum filter (17) to the second bounded series; the maximum filter (17) determining a subset of the second bounded series; and the maximum filter (17) returning the largest value of the subset of the second bounded series, the subset of the second bounded series being at least as long as the window size of the maximum filter (17).

Some embodiments include the steps of: connecting to a remote controller (19); receiving a remote control signal from the remote controller (19) using a digital communication protocol; setting at least one variable as a function of the remote control signal, the at least one variable being selected from: a window size for a moving average filter (11), a lower threshold value, an upper threshold value, a window size for the maximum filter (17), after setting the at least one variable, the method iteratively performing the steps of: reading the time series of signals from the flow sensor (5a, 5b); producing the time series of flow rates from the time series of signals; producing the averaged series of values by applying the moving average filter (11) to the time series of flow rates, the moving average filter (11) determining a plurality of subsets of the time series of flow rates and calculating an arithmetic average for each subset of the plurality of subsets, each subset of the plurality of subsets being at least as long as the window size of moving average filter (11); producing the first bounded series of values by replacing values of the averaged series that are below the lower threshold value with values that equal the lower threshold value; producing the second bounded series of values by replacing values of the first bounded series that exceed the upper threshold value with values that equal the upper threshold value; producing the maximum flow rate by applying the maximum filter (17) to the second bounded series; the maximum filter (17) determining a subset of the second bounded series; and the maximum filter (17) returning the largest value of the subset of the second bounded series, the subset of the second bounded series being at least as long as the window size of the maximum filter (17).

In some embodiments, the valve (1) additionally comprises a local controller (8) in operative communication with the flow sensor (5a, 5b) and with the actuator (7), the local controller (8) also being in operative communication with a remote controller (19), the remote controller (19) being located remotely from the local controller (8); the method comprising a plurality of iterations, each iteration comprising the steps of: the local controller (8) reading the time series of signals from the flow sensor (5a, 5b); the local controller (8) transmitting the time series of signals to the remote controller (19) using a digital communication protocol; the remote controller (19) producing the time series of flow rates from the time series of signals; the remote controller (19) producing the averaged series of values by determining a plurality of moving averages of the time series of flow rates; the remote controller (19) producing the first bounded series of values by replacing values of the averaged series that are below the lower threshold (13) with values that equal the lower threshold (13); the remote controller (19) producing the second bounded series of values by replacing values of the first bounded series that exceed the upper threshold (15) with values that equal the upper threshold (15); the remote controller (19) producing the maximum flow rate by applying the maximum filter (17) to the second bounded series, the maximum filter (17) returning the largest value of the second bounded series; the remote controller (19) transmitting the maximum flow rate to the local controller (8) using the digital communication protocol; the local controller (8) reading the set point signal (9); the local controller (8) limiting the set point signal (9) to the produced maximum flow rate; the local controller (8) producing the actuation signal from the limited set point signal (9); and the local controller (8) transmitting the actuation signal to the actuator (7), the actuation signal causing the actuator (7) to set a position of the valve member (6) in accordance with the actuation signal.

In some embodiments, the valve (1) additionally comprises a local controller (8) in operative communication with the flow sensor (5a, 5b) and with the actuator (7), the local controller (8) also being in operative communication with a remote controller (19), the remote controller (19) being located remotely from the local controller (8); the method comprising a plurality of iterations, each iteration comprising the steps of: the local controller (8) reading the time series of signals from the flow sensor (5a, 5b); the local controller (8) producing the time series of flow rates from the time series of signals; the local controller (8) transmitting the time series of flow rates to the remote controller (19) using a digital communication protocol; the remote controller (19) producing the averaged series of values by determining a plurality of moving averages of the time series of flow rates; the remote controller (19) producing the first bounded series of values by replacing values of the averaged series that are below the lower threshold (13) with values that equal the lower threshold (13); the remote controller (19) producing the second bounded series of values by replacing values of the first bounded series that exceed the upper threshold (15) with values that equal the upper threshold (15); the remote controller (19) producing the maximum flow rate by applying the maximum filter (17) to the second bounded series, the maximum filter (17) returning the largest value of the second bounded series; the remote controller (19) transmitting the maximum flow rate to the local controller (8) using the digital communication protocol; the local controller (8) reading the set point signal (9); the local controller (8) limiting the set point signal (9) to the produced maximum flow rate; the local controller (8) producing the actuation signal from the limited set point signal (9); and the local controller (8) transmitting the actuation signal to the actuator (7), the actuation signal causing the actuator (7) to set a position of the valve member (6) in accordance with the actuation signal.

As another example, some embodiments include a valve (1) comprising: a valve body having an inlet port (2) and an outlet port (3); the valve (1) comprising a fluid path (4) extending between the inlet port (2) and the outlet port (3); a valve member (6) situated in the fluid path (4) between the inlet port (2) and the outlet port (3), the valve member (6) selectively movable between a closed position which closes the fluid path (4) between the inlet port (2) and the outlet port (3), and an open position which opens the fluid path (4) between the inlet port (2) and the outlet port (3); an actuator (7), secured relative to the valve body, for selectively moving the valve member (6) between the closed position and the open position; a controller (8) secured relative to the valve body and having a memory storing a lower threshold (13) and an upper threshold (15) and being in operative communication with the memory, with the actuator (7) and being in operative communication with a flow sensor (5a, 5b), the controller (8) and being configured to iteratively: read a time series of signals from the flow sensor (5a, 5b); produce a time series of flow rates from the time series of signals; produce an averaged series of values by determining a plurality of moving averages of the time series of flow rates; produce a first bounded series of values by replacing values of the averaged series that are below the lower threshold (13) with values that equal the lower threshold (13); produce a second bounded series of values by replacing values of the first bounded series that exceed the upper threshold (15) with values that equal the upper threshold (15); produce a maximum flow rate by applying a maximum filter (17) to the second bounded series, the maximum filter (17) returning the largest value of the second bounded series; read a set point signal (9) indicative of a flow rate through the valve (1); limit the set point signal (9) to the produced maximum flow rate; produce an actuation signal from the limited set point signal; and transmit the actuation signal to the actuator (7), the actuation signal causing the actuator (7) to set a position of the valve member (6) in accordance with the actuation signal.

In some embodiments, there is: a flow sensor (5a, 5b) secured relative to the valve body; and the flow sensor (5a, 5b) being in communication with the fluid path (4) for sensing a flow rate of a fluid within the fluid path (4).

In some embodiments, the memory of the controller (8) additionally stores a scale factor; wherein the controller (8) is configured to iteratively: change the time series of flow rates by multiplying each flow rate of the time series of flow rates with the scale factor.

In some embodiments, the controller (8) comprises an input interface; and wherein the controller (8) is configured to iteratively: read the set point signal (9) from the input interface of the controller (8).

As another example, some embodiments include a computer program comprising instructions which, when the program is executed by a local controller (8), cause the local controller (8) to iteratively: read a time series of signals from a flow sensor (5a, 5b); produce a time series of flow rates from the time series of signals; transmit the time series of flow rates to a remote controller (19) using a digital communication protocol; receive a maximum flow rate from the remote controller (19) using the digital communication protocol; read a set point signal (9); limit the set point signal (9) to the received maximum flow rate; produce an actuation signal from the limited set point signal; and transmit the actuation signal to an actuator (7), the actuation signal causing the actuator (7) to set a position of a valve member (6) in accordance with the actuation signal.

As another example, some embodiments include a computer program comprising instructions which, when the program is executed by a remote controller (19), cause the remote controller (19) to iteratively: receive a time series of flow rates from a local controller (8) using a digital communication protocol; produce an averaged series of values by determining a plurality of moving averages of the time series of flow rates; produce a first bounded series of values by replacing values of the averaged series that are below a lower threshold (13) with values that equal the lower threshold (13); produce a second bounded series of values by replacing values of the first bounded series that exceed an upper threshold (15) with values that equal the upper threshold (15); produce a maximum flow rate by applying a maximum filter (17) to the second bounded series, the maximum filter (17) returning the largest value of the second bounded series; and transmit the maximum flow rate to the local controller (8) using the digital communication protocol.

BRIEF DESCRIPTION OF THE DRAWINGS

Various features are apparent to those skilled in the art from the following detailed description of the disclosed non-limiting embodiments. The drawings that accompany the detailed description can be briefly described as follows.

DETAILED DESCRIPTION

Figure 1:
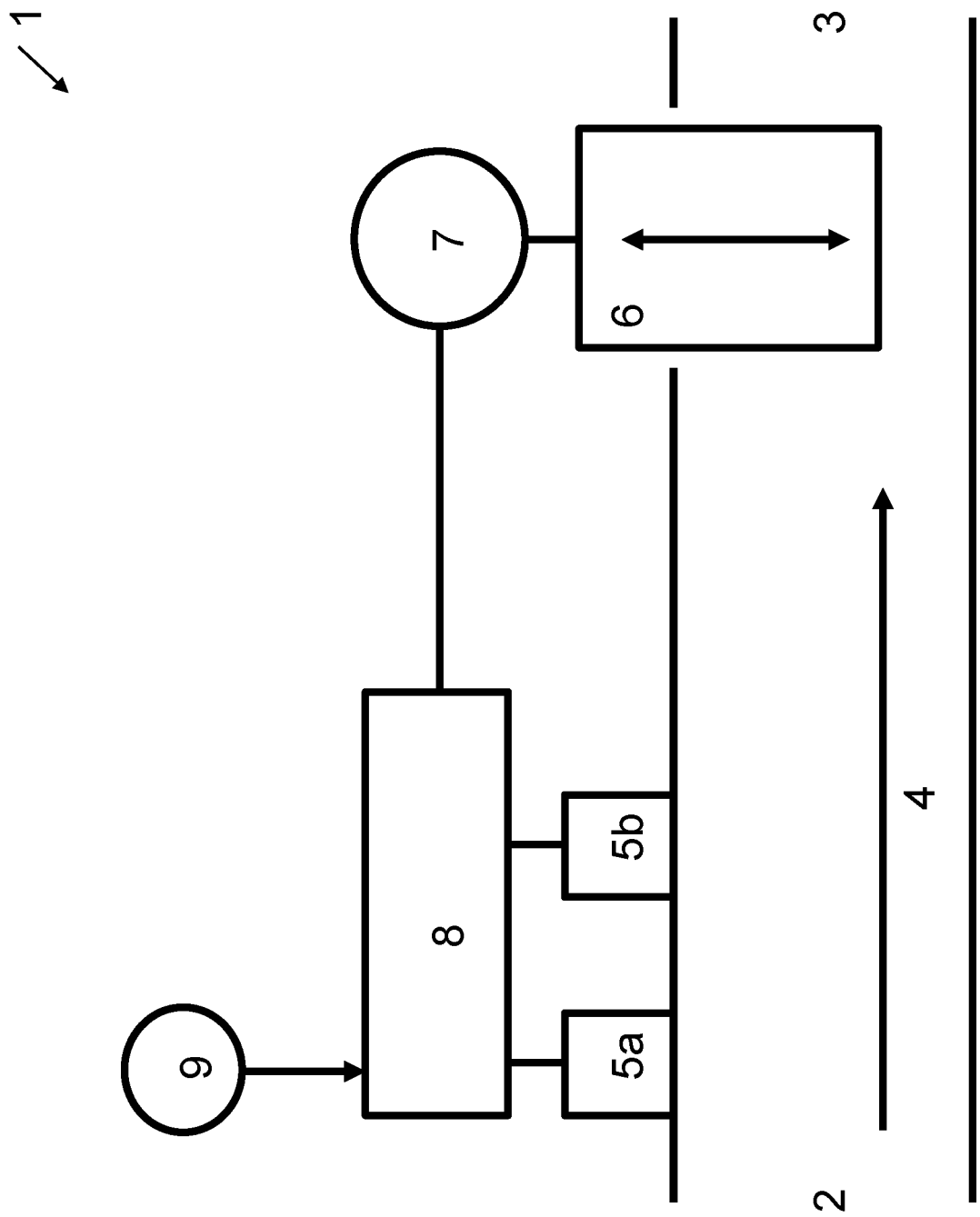
FIG. 1 schematically illustrates of a valve implementing a control algorithm incorporating teachings of the instant disclosure.

The present disclosure teaches various control algorithms that can be implemented by a valve controller and/or by a control system. The valve controller and/or the control system can, by way of non-limiting examples, be employed in an enclosed environment and/or in an installation and/or on a premise and/or in a building. The control algorithm reads a signal indicative of a flow rate and processes the signal into a measure of flow rate. The measure of flow rate is averaged by calculating and/or by determining an hourly mean. After averaging, a scale factor and a maximum filter are applied to the averaged signal. A further minimum filter is applied. As a result, the averaged value is bounded between a percentage value and a value of maximum flow. The value of maximum flow may be a value provided by a user. Eventually, a maximum value filter is applied. The filter is triggered every few hours and has a window length that exceeds the trigger interval. The filter produces a dynamic maximum flow setting to be used by the valve controller and/or by the control system.

The average value can be bounded between a percentage value such as twenty percent or thirty percent or fifty percent and a value of maximum flow. The aforementioned list of percentage values is not exhaustive. Algorithms employing low percentage values may require high amounts of computational power. Algorithms employing high percentage values incur a risk of producing dynamic maximum flow settings that are too high. The value is ideally bounded between a percentage value of or near thirty percent and a value of maximum flow.

The maximum filter can be triggered every two hours, every four hours, every eight hours, or every twelve hours. This list of trigger intervals is not exhaustive. Short trigger intervals afford values of dynamic maximum flow with better granularity. That said, short trigger intervals involve high levels of computational power. The trigger interval may be set to four hours.

In some embodiments, the window length of the maximum value filter can exceed twelve hours. The window length of the maximum value filter can also be twenty-four hours, forty-eight hours, or even exceed ninety-six hours. The mentioned values of window lengths are not exhaustive. The window length of the maximum value filter also determines the granularity of the produced value of maximum flow. Short window lengths of the filter yield more nuanced and more granular values of dynamic maximum flow. However, short window lengths may also yield values of dynamic maximum flow that are too low. The window length of the moving maximum filter advantageously is twenty-four hours.

In embodiments having a user interface, a user may harness the user interface to provide variables affecting maximum flow. Valves such as control valves and/or control systems having user interfaces afford interactions between users and the algorithm. Maintenance personnel and/or building operators can then change the constraints of the algorithm during maintenance work and during repair work.

In embodiments having connectivity to a mobile device, a user may harness an application on the mobile device to enter variables affecting maximum flow. To that end, a valve such as a control valve and/or a control system can provide connectivity with mobile devices such as radio frequency connectivity. The values entered by a user are then forwarded from the application to a data transmission interface of the mobile device. The data transmission interface of the mobile device forwards these values to a data transmission interface of the valve or of the control system. The valve and/or the control system reads the variables affecting maximum flow from its interface and feeds them to its control algorithm.

Solutions involving local user interfaces or user interfaces via mobile devices can also be configured via such interfaces. Users such as maintenance personnel and/or building operators may tune parameters such as trigger intervals and/or window lengths in accordance with local, specific needs. Also, settings such as percentages of maximum flow can change in accordance with a user's preferences.

In some embodiments, a valve such as a control valve and/or a valve associated with a heat exchanger implements the control algorithm. The valve thus locally controls its maximum flow rate. The solution can be retrofitted to legacy heat exchangers and/or to legacy terminal units. The solution confers advantages in terms of data privacy since signals and/or measures of flow rates need not be transmitted to a remote controller.

In some embodiments, a remote controller such as a cloud computer implements the control algorithm. A valve such as a control valve and/or a valve associated with a heat exchanger connects to the remote controller using a communication protocol and via a communication bus. The valve transmits signals indicative of flow rates and/or measures of flow rates to the remote controller. The remote controller leverages such flow rates and/or measures and computes a maximum flow rate. The maximum flow rate is transmitted back to the valve and/or to a controller of a HVAC installation. The valve and/or the controller of a HVAC installation then locally applies the maximum flow rate obtained from the remote controller. Solutions involving remote controllers such as cloud computers enable local valves and/or controllers of local HVAC installations having limited computational resources. In an advantageous embodiment, the local controller is or comprises an inexpensive, low-power system on a chip microcontroller having integrated wireless connectivity. In a special embodiment, the chip microcontroller has a memory not exceeding one mebibyte.

FIG. 1 shows a valve (1) having an inlet port (2) and an outlet port (3). A fluid path (4) extends between the inlet port (2) and the outlet port (3). A valve member (6) such as a conical valve member and/or a ball-type valve member is situated in the fluid path. The valve member (6) can move to a closed position which obturates the fluid path (4). The valve member (6) can also move to an open position which opens the fluid path (4).

An actuator (7) such as a valve actuator couples, e.g. mechanically couples, to the valve member (6). The actuator (7) can couple to the valve member (6) via a stem. The actuator (7) is in operative communication with a controller (8) such as a valve controller (8) and/or a local controller (8). The controller (8) ideally connects to the actuator (7) via a digital-to-analog converter. The digital-to-analog converter produces analog output signals for the actuator (7) from digital output signals of the controller (8). An amplifier can further amplify the analog signals originating from the digital-to-analog converter.

A flow sensor (5a, 5b) such as an ultrasonic flow sensor and/or a vortex flow sensor is in communication with the fluid path (4). The flow sensor (5a, 5b) as shown in FIG. 1 is part of the valve (1). That is, the valve (1) has the flow sensor (5a, 5b). The flow sensor (5a, 5b) can also be separate from the valve (1).

The controller (8) also has an interface for reading an input signal (9). The signal (9) can be an analog signal such as an analog signal in the range of several millivolts and/or an analog signal in the range from zero to twenty milliamperes. The signal (9) can also be a digital signal transmitted via a digital communication interface.

Figure 2:
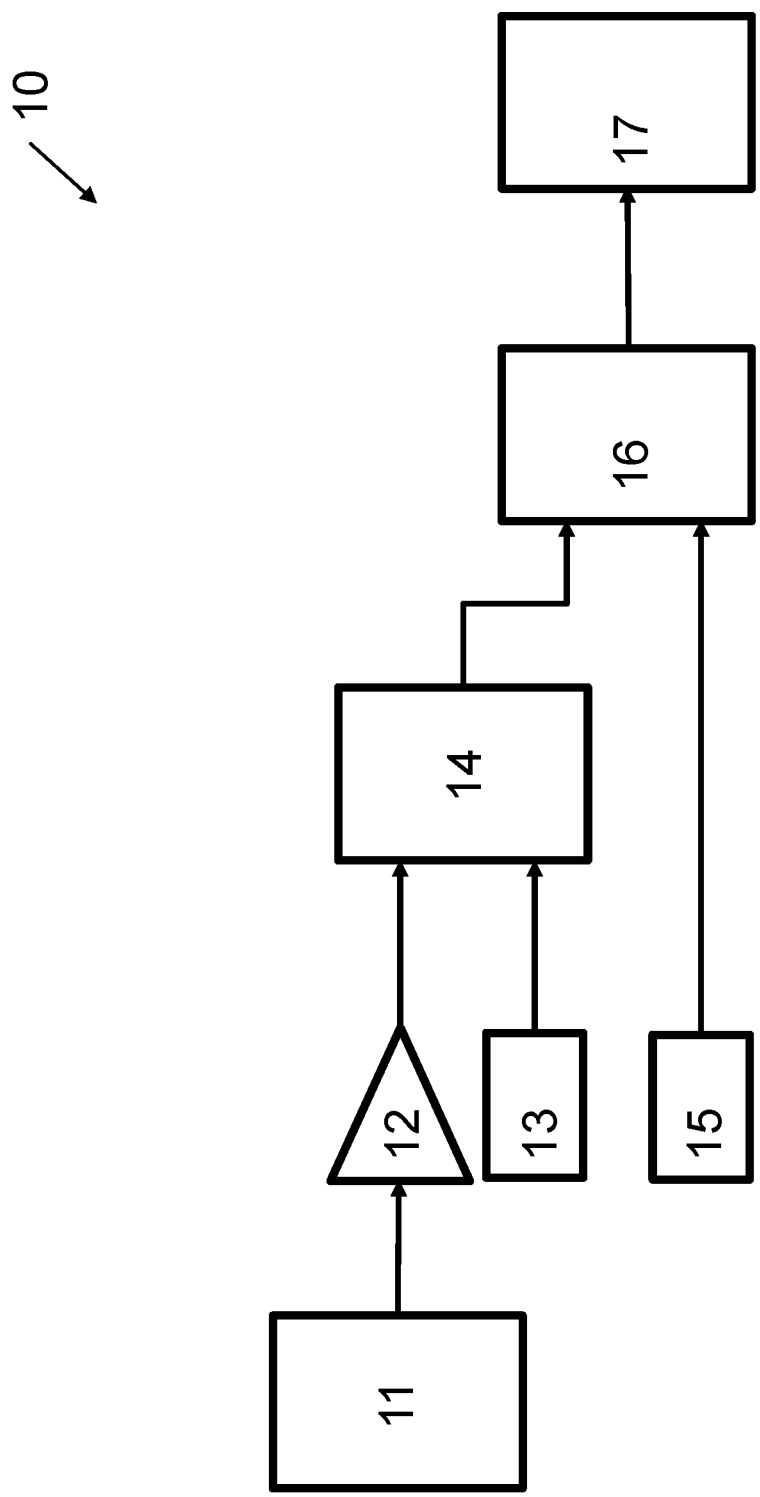
FIG. 2 is a flow chart of a control algorithm incorporating teachings of the instant disclosure.

The controller (8) of the valve (1) can implement an algorithm as illustrated in FIG. 2. A moving average filter (11) of filters flow rates and/or signals indicative of flow rates originating from the flow sensor (5a, 5b). The moving average filter (11) can be an hourly moving average filter. The moving average filter (11) can be an analog and/or a digital circuit comprised by the controller (8).

The moving average filter (11) feeds its signals to an optional multiplier (12). The optional multiplier (12) multiplies the signals produced by the moving average filter (11) with a scale factor such as two or four or ten. The multiplier (12) can be an analog and/or a digital circuit comprised by the controller (8).

A threshold filter (14) is then applied to the signals originating from the multiplier (12) and/or from the moving average filter (11). The threshold filter (14) replaces signals that are less than a threshold value (13) with that threshold value (13). The threshold filter (14) can be an analog and/or a digital circuit comprised by the controller (8).

Another threshold filter (16) is afterwards applied to the signals originating from the previous threshold filter (14). The other threshold filter (16) replaces signals that exceed another threshold value (15) with that other threshold value (15). The threshold filter (16) can be an analog and/or a digital circuit comprised by the controller (8).

A maximum filter (17) such as a moving maximum filter (17) is eventually employed to produce a maximum flow rate. The maximum filter (17) preferably returns the largest of its input signals over a given time span such as twenty-four hours. The maximum filter (17) can be an analog and/or a digital circuit comprised by the controller (8). The moving maximum filter (17) can be an analog and/or a digital circuit comprised by the controller (8).

The controller (8) of the valve (1) uses the maximum flow rate produced by the maximum filter (17) to limit flow through the valve (1). To that end, the controller (8) limits the input signal (9) to that maximum flow rate. The controller (8) can also produce a maximum flow signal from the maximum flow rate and limit the input signal (9) to the maximum flow signal. The controller (8) then produces an actuation signal to be transmitted to the actuator (7).

Figure 3:
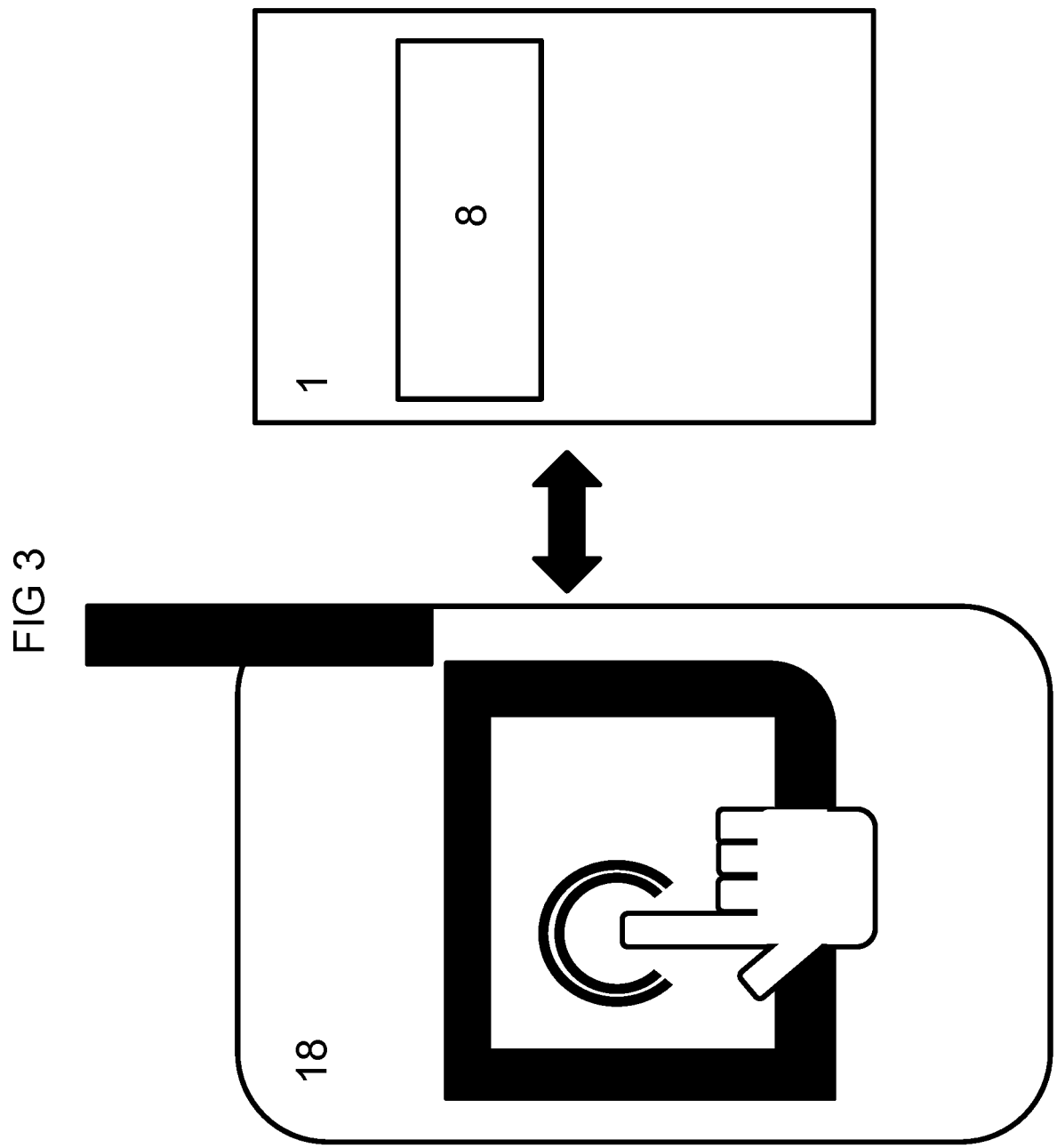
FIG. 3 schematically shows a valve in operative communication with a mobile handheld device incorporating teachings of the instant disclosure.

FIG. 3 shows the controller (8) of the valve (1) in operative communication with a mobile handheld device (18). The mobile handheld device (18) can, by way of non-limiting example, comprise a phone and/or a tablet computer. The mobile handheld device (18) communicates with the controller (8) using a wireless communication bus such as a radio-frequent communication bus. The wireless communication bus can involve phase-shift keying and/or redundant data transmission. Phase-shift keying and/or redundant data transmission afford transmission of radio-frequent signals between the controller (8) and the mobile handheld device (18) in case of long distances between the two devices (8, 18). Phase-shift keying and/or redundant data transmission also afford transmission of radio-frequent signals between the controller (8) and the mobile handheld device (18) in case of attenuation caused by concrete walls or similar.

The mobile handheld device (18) can be used to set a variable such as a filter variable and/or a process variable of the algorithm depicted in FIG. 2. The variable can, by way of non-limiting example, be a time constant and/or a window size of one of the filters (11, 17). The variable can, by way of another non-limiting example, be an upper limit or a lower limit to be factored in by one of the threshold filters (14, 16).

Figure 4:
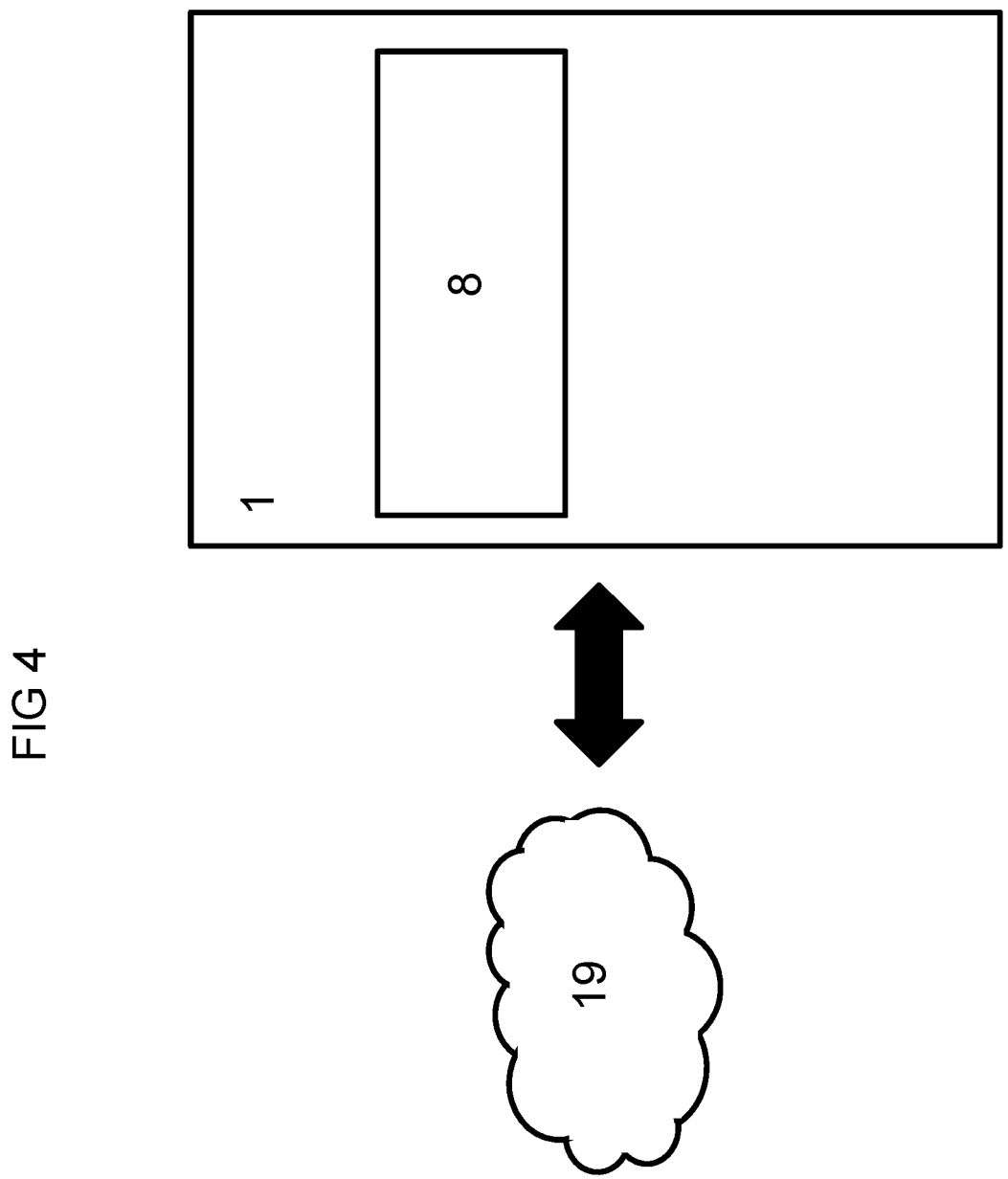
FIG. 4 schematically shows a valve in operative communication with a remote controller incorporating teachings of the instant disclosure.

FIG. 4 shows the controller (8) of the valve (1) in operative communication with a remote controller (19). The remote controller (19) can, by way of non-limiting example, comprise a cloud computer and/or a server computer. The remote controller (19) preferably communicates with the controller (8) using a communication bus such as a radio-frequent communication bus. The radio-frequent communication bus can involve phase-shift keying and/or redundant data transmission. Phase-shift keying and/or redundant data transmission afford transmission of radio-frequent signals between the controller (8) of the valve (1) and the remote controller (19) in case of long distances between the two devices (8, 19). Phase-shift keying and/or redundant data transmission also afford transmission of radio-frequent signals between the controller (8) of the valve (1) and the remote controller (19) in case of attenuation caused by concrete walls or similar.

The remote controller (19) can be used to set a variable such as a filter variable and/or a process variable of the algorithm depicted in FIG. 2. The variable can, by way of non-limiting example, be a time constant and/or a window size of one of the filters (11, 17). The variable can, by way of another non-limiting example, be an upper limit or a lower limit to be factored in by one of the threshold filters (14, 16).

The remote controller (19) can also perform part of the control algorithm as illustrated in FIG. 2. In some embodiments, the controller (8) of the valve (1) samples readings from the flow sensor (5a, 5b) and transmits these readings to the remote controller (19). The remote controller (19) performs the steps of the algorithm illustrated in FIG. 2 and transmits a maximum flow rate back to the controller (8) of the valve (1). The controller (8) of the valve (1) then uses the maximum flow rate to limit flow through the valve (1) and/or flow along the fluid path (4). In some embodiments, the controller (8) of the valve (1) produces flow rates from the signals sampled from the flow sensor (5a, 5b). The flow rates (5a, 5b) are then transferred to the remote controller (19) and processed as described above.

In some embodiments, the controller (8) comprises a local controller (8). The local controller (8) is local at the valve (1). By contrast, a remote controller (19) is not local at the valve (1). The remote controller (19) can, by way of non-limiting example, be arranged at a distance of at least ten metres or at least one hundred metres or even at least one kilometer from the valve (1).

In some embodiments, the actuation signal is preferably indicative of a position of the valve member (6). That is, the method comprises a plurality of iterations, each iteration comprising the steps of: producing an actuation signal indicative of a position of the valve member (6) from the limited set point signal; and transmitting the actuation signal to the actuator (7), the actuation signal causing the actuator (7) to set a position of the valve member (6) in accordance with the position indicated by the actuation signal.

In some embodiments, the scale factor is a predetermined scale factor. The scale factor may be the same for all flow rates of the time series of flow rates.

In some embodiments, the first threshold filter (14) comprises a less than filter. The less than filter replaces any value below the lower threshold (13) with a value that equals the lower threshold (13).

In some embodiments, the second threshold filter (16) is or comprises a greater than filter. The greater than filter replaces any value above the upper threshold (15) with a value that equals the upper threshold (15).

In some embodiments, the maximum filter (17) determines a subset of the second bounded series, the subset of the second bounded series being at least twelve hours long or being at least twenty-four hours long or being at least forty-eight hours long.

That is, the maximum filter (17) has a window size of at least twelve hours or of at least twenty-four hours or of at least forty-eight hours.

In some embodiments, the maximum filter (17) determines a subset of the second bounded series, the subset of the second bounded series being at least twelve hours long or being at least twenty-four hours long or being at least forty-eight hours long. That is, the maximum filter (17) has a window size of at least twelve hours or of at least twenty-four hours or of at least forty-eight hours.

In some embodiments, the maximum filter (17) has a window size of the maximum filter (17) and the second bounded series has a length. The window size of the maximum filer (17) exceeds the length of the second bounded series. That is, the method comprises a plurality of iterations, each iteration comprising the step of: producing a maximum flow rate by applying a maximum filter (17) to the second bounded series, the second bounded series having a length and the maximum filter (17) having window size exceeding the length of the second bounded series, the maximum filter (17) returning the largest value of the second bounded series.

In some embodiments, the window size of the maximum filter (17) is a time span of the maximum filter (17). The second bounded series also has a time span. The time span of the maximum filter (17) exceeds the time span of the second bounded series.

In some embodiments, the step of connecting to a mobile handheld device (18) involves connecting to a mobile handheld device (18) using a digital communication bus. The digital communication bus may comprise a wireless communication bus. In some embodiments, the mobile handheld device (18) comprises a mobile phone and/or a tablet computer.

In some embodiments, the step of connecting to a remote controller (19) involves connecting to a remote controller (19) using a digital communication bus. The digital communication bus may comprise a wireless communication bus.

In some embodiments, the remote controller (19) comprises a cloud computer. In some embodiments, the local controller (8) comprises a microcontroller (8) and/or a microprocessor (8).

In some embodiments, each iteration comprises the step of the remote controller (19) changing the time series of flow rates by multiplying each flow rate of the time series of flow rates with a scale factor. The local controller (8) is different from the remote controller (19).

In some embodiments, the set point signal (9) advantageously is a single set point signal. The set point signal (9) does not necessarily comprise a time series of signals or positions.

As to the methods disclosed above, these methods comprise a plurality of iterations, wherein the plurality of iterations comprises two or more iterations. In some embodiments, the plurality of iterations can comprise five or more iterations or even ten or more iterations.

In some embodiments, the methods disclosed above comprise a plurality of iterations to be performed consecutively, each consecutive iteration comprising the steps specified above. In some embodiments, the methods disclosed above comprise a plurality of iterations to be performed repeatedly, each repeated iteration comprising the steps specified above.

In some embodiments, the flow sensor (5a, 5b) is not part of the valve (1). In some embodiments, the flow sensor (5a, 5b) is part of the valve (1).

In some embodiments, the actuator (7) of the valve (1) comprises a valve actuator (7). In some embodiments, the actuator (7) of the valve (1) couples to the valve member (6) of the valve (1).

The actuator (7) of the valve (1) can be or can comprise a solenoid actuator.

In some embodiments, the controller (8) comprises a valve controller (8) such as a microcontroller (8) and/or a microprocessor (8). In some embodiments, the controller (8) comprises a local controller (8) such as a microcontroller (8) and/or a microprocessor (8). The controller (8) and/or the valve controller (8) and/or the local controller (8) and/or the microcontroller (8) and/or the microprocessor (8) can be mounted to the valve body.

In some embodiments, the actuator (7) is mounted to the valve body. In some embodiments, the valve member (6) is secured relative to the valve body and/or that the valve member (6) is mounted to the valve body.

In some embodiments, the flow, especially the fluid flow as detailed above, takes place along the fluid path (4) of the valve (1). In some embodiments, the valve (1) advantageously has a controller (8) such as a microcontroller (8) and/or a microprocessor (8). The valve (1) ideally is or comprises a control valve.

In some embodiments, the flow sensor (5a, 5b) is in communication with the fluid path (4) for sensing a flow rate of a fluid flowing along the fluid path (4). It is still envisaged that the flow sensor (5a, 5b) is in communication with the fluid path (4) for sensing a flow rate of a fluid flowing through the fluid path (4). In some embodiments, the flow sensor (5a, 5b) is mounted to the valve body.

In some embodiments, the valve (1) has a flow sensor (5a, 5b). The flow sensor (5a, 5b) can be arranged along the fluid path (4) and/or outside the fluid path (4) and/or in the fluid path (4). The flow sensor (5a, 5b) can, by way of non-limiting example, be an ultrasonic flow sensor and/or a vortex flow sensor.

In some embodiments, the scale factor is a predetermined scale factor. The scale factor may be the same for all flow rates of the time series of flow rates.

In some embodiments, the input interface of the controller (8) comprises an analog input port and/or an analog input pin. The input interface of the controller (8) can be an analog input port of a microcontroller (8) and/or an analog input port of a microprocessor (8). The input interface of the controller (8) can also be an analog input pin of a microcontroller (8) and/or an analog input pin of a microprocessor (8). In some embodiments, the input interface of the controller (8) comprises a digital input port and/or a digital input pin. The input interface of the controller (8) can be a digital input port of a microcontroller (8) and/or a digital input port of a microprocessor (8). The input interface of the controller (8) can also be a digital input pin of a microcontroller (8) and/or a digital input pin of a microprocessor (8).

In some embodiments, the controller (8) comprises a screen having a graphical user interface and/or a touch screen having a graphical user interface. The screen and/or the touch screen forms the input interface of the controller (8).

In some embodiments, the actuation signal is indicative of a position of the valve member (6). That is, the controller (8) of the valve (1) is configured to iteratively: produce an actuation signal indicative of a position of the valve member (6) from the limited set point signal; and transmit the actuation signal to the actuator (7), the actuation signal causing the actuator (7) to set a position of the valve member (6) in accordance with the position indicated by the actuation signal.

In some embodiments, the set point signal (9) is a single set point signal. The set point signal (9) does ideally not comprise a time series of signals or positions.

In some embodiments, as to the aforementioned valves (1), the controllers (8) of these valves (1) are configured to iteratively perform the specified steps in at least two iterations, in at least five iterations or even in at least ten iterations.

In some embodiments, the controllers (8) of the valves (1) disclosed above are configured to perform the steps as specified in consecutive iterations.

In some embodiments, the controllers (8) of the valves (1) disclosed above are configured to perform the steps as specified repeatedly in iterations.

In some embodiments, the set point signal (9) is indicative of a flow rate through a valve (1) controlled by the local controller (8).

In some embodiments, the maximum filter (17) comprises a moving maximum filter.

In some embodiments, the remote controller (19) is configured to iteratively: change the time series of flow rates by multiplying each flow rate of the time series of flow rates with a scale factor.

In some embodiments, the remote controller (19) comprises the maximum filter (17). The maximum filter (17) of the remote controller (19) can be a moving maximum filter (17) of the remote controller (19).

In some embodiments, the set point signal (9) is a single set point signal. The set point signal (9) does may not comprise a time series of signals or positions.

In some embodiments, these computer programs comprise instructions, which, when the program is executed by a local controller (8) or by a remote controller (19), perform a plurality of iterations comprising the steps as specified, wherein the plurality of iterations comprises two or more iterations. It is also envisaged that the plurality of iterations can comprise five or more iterations or even ten or more iterations.

In some embodiments, the computer program disclosed above comprises instructions, which, when the program is executed by a local controller (8) or by a remote controller (19), perform a plurality of consecutive iterations, each consecutive iteration having the specified steps.

In some embodiments, the computer program disclosed above comprises instructions, which, when the program is executed by a local controller (8) or by a remote controller (19), perform a plurality of repeated iterations, each repeated iteration having the specified steps.

It should be understood that the foregoing relates only to certain embodiments of the disclosure and that numerous changes can be made therein without departing from the scope of the disclosure as defined by the following claims. It should also be understood that the disclosure is not restricted to the illustrated embodiments and that various modifications can be made within the scope of the claims.

REFERENCE NUMERALS 1 valve
2 inlet
3 outlet
4 fluid path
5a, 5b flow sensor
6 valve member
7 actuator
8 controller
9 set point signal
10 control algorithm
11 moving average filter
12 multiplier
13 lower threshold
14 first threshold filter
15 upper threshold
16 second threshold filter
17 maximum filter
18 mobile handheld device
19 remote controller

The invention claimed is:

1. A method of limiting flow through a valve comprising a valve member and an actuator, the method comprising:
reading a time series of signals from a flow sensor;
producing a time series of flow rates from the time series of signals;
producing an averaged series of values by determining a plurality of moving averages of the time series of flow rates;
producing a first bounded series of values by replacing any values of the averaged series that are below a lower threshold with replacement values that equal the lower threshold;
producing a second bounded series of values by replacing any values of the first bounded series that exceed an upper threshold with replacement values that equal the upper threshold;
producing a maximum flow rate by applying a maximum filter to the second bounded series, the maximum filter returning the largest value of the second bounded series;
reading a set point signal indicative of a flow rate through the valve;
limiting the set point signal to the produced maximum flow rate;
producing an actuation signal from the limited set point signal; and
transmitting the actuation signal to the actuator, the actuation signal causing the actuator to set a position of the valve member in accordance with the actuation signal.

2. The method according to claim 1, further comprising changing the time series of flow rates by multiplying each flow rate of the time series of flow rates with a scale factor.

3. The method according to claim 1, further comprising:
connecting to a mobile handheld device;
receiving a mobile application signal from the mobile handheld device using a digital communication protocol;
setting a first variable as a function of the mobile application signal, the first variable selected from the group consisting of: a window size for a moving average filter, a lower threshold value, an upper threshold value, and a window size of for the maximum filter;
after setting the at least one variable, iteratively:
reading the time series of signals from the flow sensor;
producing the time series of flow rates from the time series of signals;
producing the averaged series of values by applying the moving average filter to the time series of flow rates, the moving average filter determining a plurality of subsets of the time series of flow rates and calculating an arithmetic average for each subset of the plurality of subsets, each subset of the plurality of subsets being at least as long as the window size of moving average filter;
producing the first bounded series of values by replacing values of the averaged series that are below the lower threshold value with values that equal the lower threshold value;
producing the second bounded series of values by replacing values of the first bounded series that exceed the upper threshold value with values that equal the upper threshold value;
producing the maximum flow rate by applying the maximum filter to the second bounded series;
the maximum filter determining a subset of the second bounded series; and
the maximum filter returning the largest value of the subset of the second bounded series, the subset of the second bounded series being at least as long as the window size of the maximum filter.

4. The method according to claim 1, further comprising:
connecting to a remote controller;
receiving a signal from the remote controller using a digital communication protocol;
setting a first variable as a function of the remote control signal, the first variable selected from the group consisting of: a window size for a moving average filter, a lower threshold value, an upper threshold value, and a window size for the maximum filter (17),
after setting the first variable, iteratively performing the steps of:
reading the time series of signals from the flow sensor;

producing the time series of flow rates from the time series of signals;
producing the averaged series of values by applying the moving average filter to the time series of flow rates, the moving average filter determining a plurality of subsets of the time series of flow rates and calculating an arithmetic average for each subset of the plurality of subsets, each subset of the plurality of subsets being at least as long as the window size of moving average filter;
producing the first bounded series of values by replacing values of the averaged series that are below the lower threshold value with values that equal the lower threshold value;
producing the second bounded series of values by replacing values of the first bounded series that exceed the upper threshold value with values that equal the upper threshold value;
producing the maximum flow rate by applying the maximum filter to the second bounded series;
the maximum filter determining a subset of the second bounded series; and
the maximum filter returning the largest value of the subset of the second bounded series, the subset of the second bounded series being at least as long as the window size of the maximum filter.

5. The method according to claim 1, wherein:
the valve comprises a local controller in operative communication with the flow sensor and the actuator, and with a remote controller located remotely from the local controller;
the method comprising a plurality of iterations, each iteration comprising:
the local controller reading the time series of signals from the flow sensor;
the local controller transmitting the time series of signals to the remote controller using a digital communication protocol;
the remote controller producing the time series of flow rates from the time series of signals;
the remote controller producing the averaged series of values by determining a plurality of moving averages of the time series of flow rates;
the remote controller producing the first bounded series of values by replacing values of the averaged series that are below the lower threshold with values that equal the lower threshold;
the remote controller producing the second bounded series of values by replacing values of the first bounded series that exceed the upper threshold with values that equal the upper threshold;
the remote controller producing the maximum flow rate by applying the maximum filter to the second bounded series, the maximum filter returning the largest value of the second bounded series;
the remote controller transmitting the maximum flow rate to the local controller using the digital communication protocol;
the local controller reading the set point signal;
the local controller limiting the set point signal to the produced maximum flow rate;
the local controller producing the actuation signal from the limited set point signal; and
the local controller transmitting the actuation signal to the actuator, the actuation signal causing the actuator to set a position of the valve member in accordance with the actuation signal.

6. The method according to claim 1, wherein the valve comprises a local controller in operative communication with the flow sensor and the actuator, and a remote controller located remotely from the local controller;
the method further comprising a plurality of iterations, each iteration comprising:
the local controller reading the time series of signals from the flow sensor;
the local controller producing the time series of flow rates from the time series of signals;
the local controller transmitting the time series of flow rates to the remote controller using a digital communication protocol;
the remote controller producing the averaged series of values by determining a plurality of moving averages of the time series of flow rates;
the remote controller producing the first bounded series of values by replacing values of the averaged series that are below the lower threshold with values that equal the lower threshold;
the remote controller producing the second bounded series of values by replacing values of the first bounded series that exceed the upper threshold with values that equal the upper threshold;
the remote controller producing the maximum flow rate by applying the maximum filter to the second bounded series, the maximum filter returning the largest value of the second bounded series;
the remote controller transmitting the maximum flow rate to the local controller using the digital communication protocol;
the local controller reading the set point signal;
the local controller limiting the set point signal to the produced maximum flow rate;
the local controller producing the actuation signal from the limited set point signal; and
the local controller transmitting the actuation signal to the actuator, the actuation signal causing the actuator to set a position of the valve member in accordance with the actuation signal.

7. A valve comprising:
a valve body defining a fluid path from an inlet port and an outlet port;
a valve member situated in the fluid path, the valve member selectively movable between a closed position blocking the fluid path and an open position;
an actuator secured relative to the valve body for selectively moving the valve member between the closed position and the open position;
a controller having a memory storing a lower threshold and an upper threshold and in operative communication with the memory, the actuator, and a flow sensor;
the controller programmed to iteratively:
read a time series of signals from the flow sensor;
produce a time series of flow rates from the time series of signals;
produce an averaged series of values by determining a plurality of moving averages of the time series of flow rates;
produce a first bounded series of values by replacing values of the averaged series that are below the lower threshold with values that equal the lower threshold;
produce a second bounded series of values by replacing values of the first bounded series that exceed the upper threshold with values that equal the upper threshold;

produce a maximum flow rate by applying a maximum filter to the second bounded series, the maximum filter returning the largest value of the second bounded series;

read a set point signal indicative of a flow rate through the valve;

limit the set point signal to the produced maximum flow rate;

produce an actuation signal from the limited set point signal; and transmit the actuation signal to the actuator, the actuation signal indicating a position of the valve member.

8. The valve according to claim 7, further comprising a flow sensor for sensing a flow rate of a fluid within the fluid path.

9. The valve according to claim 7, wherein:
the memory stores a scale factor; and
the controller is configured to iteratively change the time series of flow rates by multiplying each flow rate of the time series of flow rates with the scale factor.

10. The valve according to claim 7, wherein:
the controller comprises an input interface; and
the controller is configured to iteratively read the set point signal from the input interface of the controller.

11. A non-transitory storage medium storing a computer program comprising a set of instructions which, when executed by a local controller, cause the local controller to iteratively:

read a time series of signals from a flow sensor;

produce an averaged series of values by determining a plurality of moving averages of the time series of flow rates;

produce a first bounded series of values by replacing any values of the averaged series that are below a lower threshold with replacement values that equal the lower threshold;

produce a second bounded series of values by replacing any values of the first bounded series that exceed an upper threshold with replacement values that equal the upper threshold;

produce a maximum flow rates by applying a maximum filter to the second bounded series, the maximum filter returning the largest value of the second bounded series;

read a set point signal indicative of a flow rate through a valve;

limit the set point signal to the produced maximum flow rate;

produce an actuation signal from the limited set point signal; and transmit the actuation signal to an actuator, the actuation signal indicating a position of a valve member, the actuation signal causing the actuator to set a position of the valve member to the indicated position.

* * * * *